United States Patent
Chen et al.

(10) Patent No.: US 7,256,632 B2
(45) Date of Patent: Aug. 14, 2007

(54) PULSE WIDTH MODULATION (PWM) CONTROLLING MODULE AND METHOD FOR ADJUSTING A PWM SIGNAL THEREOF

(75) Inventors: Tseng-Wen Chen, Hsinchu (TW); Wen-Chi Fang, Hsinchu (TW); Yun-Chiang Wang, Hsinchu (TW); Yaw-Huei Tseng, Hsinchu (TW)

(73) Assignee: Feature Integration Technology Inc., Jubei, Hsinchu (TW)

( * ) Notice: Subject to any disclaimer, the term of this patent is extended or adjusted under 35 U.S.C. 154(b) by 247 days.

(21) Appl. No.: 10/907,895

(22) Filed: Apr. 20, 2005

(65) Prior Publication Data

US 2006/0239044 A1 Oct. 26, 2006

(51) Int. Cl.
*H03K 3/017* (2006.01)
*H03K 5/04* (2006.01)
*H03K 7/08* (2006.01)

(52) U.S. Cl. .................. 327/175; 327/176; 327/31; 327/35; 327/36; 327/37; 375/238

(58) Field of Classification Search ............. 363/41, 363/21.1, 21.11, 21.18, 26; 327/26, 31–38, 327/164, 172–184; 375/238
See application file for complete search history.

(56) References Cited

U.S. PATENT DOCUMENTS

| | | | | |
|---|---|---|---|---|
| 4,943,902 A | * | 7/1990 | Severinsky | 363/80 |
| 5,442,271 A | | 8/1995 | Hatanaka et al. | |
| 6,049,471 A | * | 4/2000 | Korcharz et al. | 363/20 |
| 6,169,680 B1 | * | 1/2001 | Matsui et al. | 363/21.05 |
| 6,836,415 B1 | * | 12/2004 | Yang et al. | 363/21.01 |

FOREIGN PATENT DOCUMENTS

TW 270255 2/1996

* cited by examiner

*Primary Examiner*—Bao Q. Vu
*Assistant Examiner*—Stuart Hansen
(74) *Attorney, Agent, or Firm*—Winston Hsu

(57) ABSTRACT

A pulse width modulation (PWM) controlling module, includes: a PWM controller, a load detector, and an adjusting module. The PWM controller generates a PWM signal that is utilized for controlling a supply voltage applied to an electronic system. The load detector, coupled to the PWM controller, detects a load of the electronic system according to the PWM signal and generates a decision value accordingly. The adjusting module, coupled to the PWM controller and the load detector, controls the PWM controller to adjust the PWM signal according to the decision value.

14 Claims, 3 Drawing Sheets

PULSE WIDTH MODULATION (PWM) CONTROLLING MODULE AND METHOD FOR ADJUSTING A PWM SIGNAL THEREOF

BACKGROUND OF INVENTION

1. Field of the Invention

The present invention relates to a PWM IC, and more particularly, to a PWM IC, which is capable of adjusting the PWM signal according to the load of an electronic device coupled to the PWM IC.

2. Description of the Prior Art

A pulse width modulation (PWM) IC is typically utilized in a power supply system. The power supply system provides an output voltage according to a PWM signal generated by the PWM IC. The PWM signal is typically a square wave whose characteristics are defined by a high level, a low level, and a duty cycle. The duty cycle of the PWM signal determines the output voltage of the power supply system: when the duty cycle of the PWM signal increases, the power supply system accordingly outputs a greater output voltage, however, when the duty cycle of the PWM signal decreases, the power supply system accordingly outputs a lower output voltage. Therefore, a power supply system typically utilizes a PWM IC to determine the output voltage.

When a power supply system is utilized to power electronic devices such as a motherboard, a graphic card, a notebook, or a cell phone, the output voltage of the power supply system must change in accordance with the load of the electronic device. For example, when the load of the electronic device increases, the output voltage of the power supply system must increase to ensure that the electronic device can be operated in a proper condition. Alternatively, when the load of the electronic device decreases, the output voltage of the power supply system must decrease correspondingly to reduce the system power consumption or protect the electronic device from damage by an abnormal voltage.

Since the output voltage of the power supply system is dominated by the PWM signal of the PWM IC, the output voltage can be adjusted by changing the PWM signal. Typically, adjusting the PWM signal is implemented by utilizing an outer control signal such as a GPIO signal to adjust the reference voltage of the PWM IC or utilizing an outer circuit to change the digital ID input signal of the PWM IC to change the duty cycle or the output voltage. However, these two methods do not adjust the output voltage real-time directly corresponding to the load of the electronic device. Moreover, the outer circuit along with an outer program, which controls the outer circuit, results in a higher cost and inconvenience.

SUMMARY OF INVENTION

It is an objective of the claimed invention to provide a PWM controlling module capable of adjusting its PWM signal without an outer circuit or signal. The claimed invention also provides the corresponding method to solve the aforementioned problem.

According to the claimed invention, a pulse width modulation (PWM) controlling module is disclosed. The PWM controlling module comprises: a PWM controller, a load detector, and an adjusting module. The PWM controller generates a PWM signal that is utilized for controlling a supply voltage applied to an electronic system. The load detector, coupled to the PWM controller, detects a load of the electronic system according to the PWM signal and generates a decision value accordingly. The adjusting module, coupled to the PWM controller and the load detector, controls the PWM controller to adjust the PWM signal according to the decision value.

According to the claimed invention, a method for adjusting a pulse width modulation (PWM) signal of a PWM controlling module is disclosed. The method comprises: generating the PWM signal that is utilized for controlling a supply voltage applied to an electronic system; detecting a load of the electronic system according to the PWM signal and generating a decision value accordingly; and adjusting the PWM signal according to the decision value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
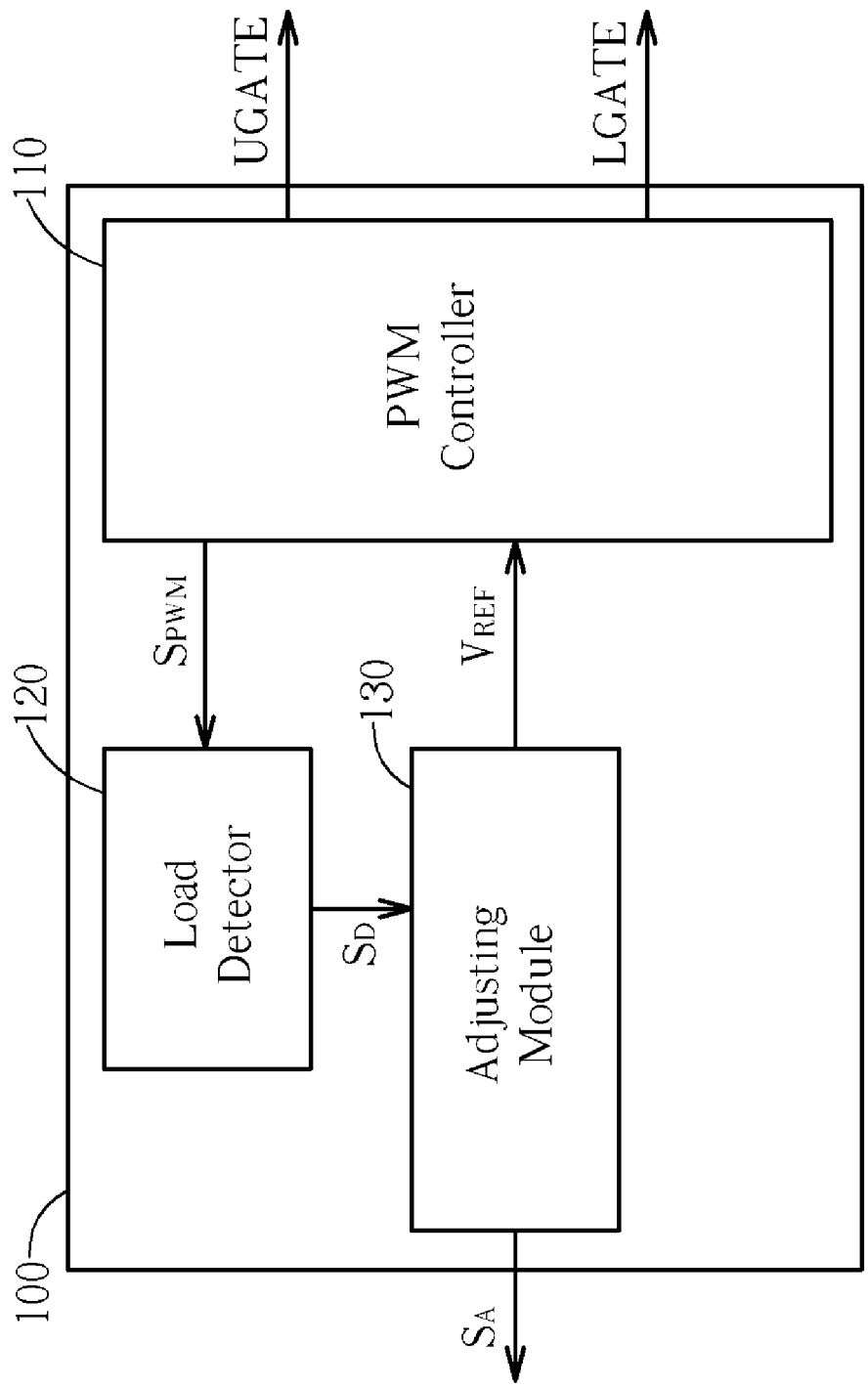
FIG. 1 is a diagram of a PWM IC according to one embodiment of the present invention.

Please refer to FIG. 1, which shows a PWM IC according to an embodiment of the present invention. The PWM IC 100 includes a PWM controller 110, which generates PWM signals such as UGATE signals or LGATE signals to drive a following stage (not shown). For example, if the PWM IC 100 is positioned in a power supply system then the UGATE and the LGATE signals are utilized to control a switching circuit that generally consists of two MOSFETs. A load detector 120 is coupled to the PWM controller 110 to detect the load of an electronic device (not shown) coupled to the PWM IC 100. As mentioned above, the supply voltage applied to the electronic device must change dynamically according to the load of the electronic device and the supply voltage is dominated by the PWM signal of the PWM controller 110. Therefore, the load of the electronic device can be detected by processing the PWM signal generated by the PWM controller 110.

According to the embodiments of the present invention, the load detector 120 detects the PWM signal $S_{PWM}$ of the PWM controller 110 in three ways:

1. The load detector 120 utilizes a sampler to sample the PWM signal and generates several sampled values. Because the PWM signal is a square wave, these sampled values are either at a first logic level (the high level of the square wave) or at a second logic level (the low level of the square wave). Afterward, these sampled values are counted by a counter coupled to the sampler. For example, during a specific period, the counter sums the sampled values corresponding to the first logic as a first number and then sums the sampled values corresponding to the second logic as a second number. As a result, the ratio of the first number to the second number is determined as a decision value $S_D$.

2. The load detector 120 utilizes an integrator to process the PWM signal. The integrator integrates the PWM signal during a specific period to transform the duty cycle into a voltage level. Therefore, the voltage level is determined as the decision value $S_D$.

3. The load detector 120 may simply detect the load current of the PWM controller 110 to generate the decision value. Because the load current of the PWM controller 110 is proportional to the load of the electronic device, the magnitude of the current can be regarded as the decision value $S_D$.

Figure 2:
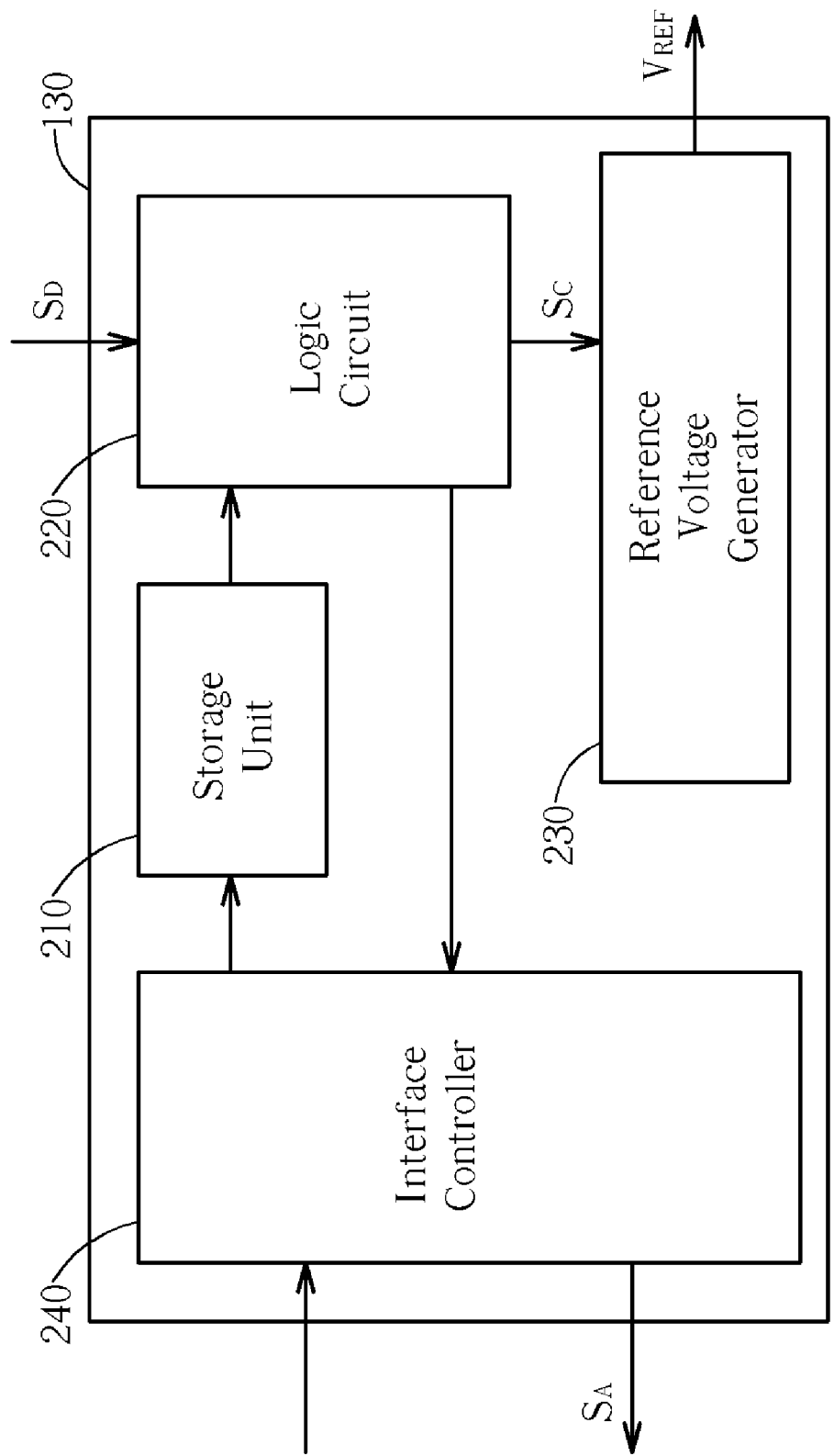
FIG. 2 is a diagram of an adjusting module shown in FIG. 1 according to one embodiment of the present invention.

After the decision value $S_D$ is generated, it is received by an adjusting module 130 that is coupled to the PWM controller 110 and the load detector 120. The adjusting module 130 is utilized for controlling the PWM controller to adjust the PWM signal according to the decision value. Please refer to FIG. 2, which shows an embodiment of the adjusting module 130. The adjusting module 130 comprises a storage unit 210 (e.g., a flash memory or a register) that stores some register values. The storage unit 210 is coupled to a logic circuit 220. The logic circuit 220 receives the decision value $S_D$ and then compares the decision value $S_D$ with the register value to generate a control signal $S_C$. The control signal $S_C$ is further transferred to a reference voltage generator 230. The reference voltage generator 230 is utilized to provide the PWM controller 110 with a reference voltage $V_{ref}$ that determines the duty cycle of the PWM signal. Here, the reference voltage generator 230 generates the reference voltage $V_{ref}$ according to the control signal $S_C$. Therefore, the duty cycle of the PWM signal can be adjusted according to the load of the electronic device, i.e., the output voltage of the power supply system can be adjusted according to the load of the electronic device. The adjusting module 130 further comprises an interface controller 240 that is coupled to the storage unit 210. The register values stored in the storage unit 210 can be preset in a look-up table or determined arbitrarily by the user. Through the interface controller 240 the register values stored in the storage unit 210 can be set by the user. Moreover, the interface controller 240 is also coupled to the logic circuit 220. The logic circuit 220 compares the decision value with the register values to generate the control signal $S_C$ and at least an alarm signal $S_A$. The alarm signal $S_A$ is outputted through the interface controller 240. If the decision value $S_D$ indicates that the load of the electronic device exceeds a safe range (e.g., a high limit or a low limit) then the alarm signal $S_A$ is utilized to perform protective actions. Protective actions might include actions such as: adjusting the system frequency of the electronic device, blinking an LED to alert the user, or suspending or powering off the electronic device.

Figure 3:
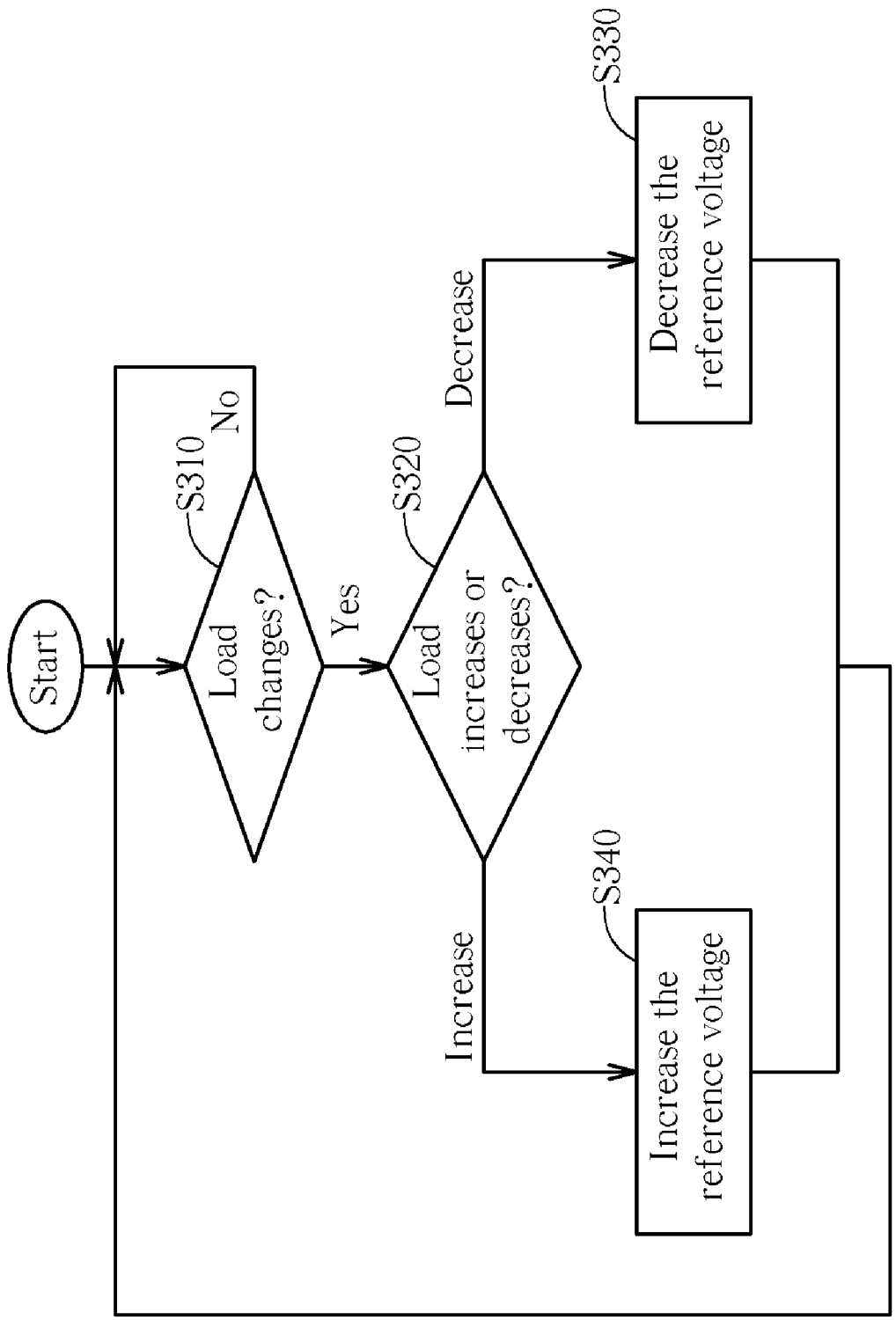
FIG. 3 is a flow chart of adjusting the PWM signal of the PWM IC shown in FIG. 1.

Please refer to FIG. 3, which shows the flow chart of adjusting the PWM signal of the PWM IC 100. Initially, at step S310, the load detector 120 detects the PWM signal of the PWM controller 110 to monitor the load of the power supply system. The load detector 120 continues detecting the load of the power supply system until the load detector 120 detects a load change of the power supply system. If the load changes, then at step S320 the logic circuit 220 checks the load increases or decreases by comparing the decision value $S_D$ with the register value. If the load decreases, based on the logic circuit 220 check at step S330 then the reference voltage generator 230 decreases the reference voltage $V_{ref}$ according to the control signal $S_C$ to further decrease the duty cycle of the PWM signal, and therefore the output voltage of the power supply system decreases accordingly. In another example, if the load increases, based on the logic circuit 220 check at step S340 then the reference voltage generator 230 increases the reference voltage $V_{ref}$ according to the control signal $S_C$ to further increase the duty cycle of the PWM signal, and therefore the output voltage of the power supply system increases accordingly.

In summary, the present invention provides a PWM IC that can generate the PWM output voltage according to the load of an electronic device by detecting the PWM signals. Therefore, by utilizing the PWM IC provided by the present invention, the power supply system can dynamically alter the output voltage that is applied to the electronic device to ensure the electronic device is operated under a proper voltage depending on a heavy or slight device loading. The invention could reduce the average power consumption of the device since it will decrease the voltage output and power consumption when it is not necessary. Furthermore, with the limit setting and alarm signals, the invention could protect the electronic device from being operated in a dangerous condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pulse width modulation (PWM) controlling module comprising:
    a PWM controller for generating a PWM signal, the PWM signal being utilized for controlling a supply voltage applied to an electronic system;
    a load detector, coupled to the PWM controller, for detecting a load of the electronic system according to the PWM signal and generating a decision value accordingly; and
    an adjusting module, coupled to the PWM controller and the load detector, for controlling the PWM controller to adjust the PWM signal according to the decision value, the adjusting module comprising:
        a storage unit for storing a plurality of predetermined values;
        a logic circuit, coupled to the load detector and the storage unit, for comparing the decision value with a first predetermined value to generate a control signal utilized to control the PWM controller; and
        a reference voltage generator, coupled between the logic circuit and the PWM controller, for adjusting a reference voltage utilized by the PWM controller according to the control signal.

2. The PWM controlling module of claim 1 wherein the adjusting module further comprises:
    an interface controller, coupled to the storage unit, for receiving an input value and storing the input value into the storage unit as a predetermined value.

3. The PWM controlling module of claim 2 wherein the logic circuit is coupled to the interface controller and further compares the decision value with a second predetermined value to generate at least an alarm signal outputted through the interface controller to indicate that the load of the electronic system exceeds or deceeds an allowable range.

4. The PWM controlling module of claim 1 wherein the load detector comprises:
    a sampler for sampling the PWM signal to generate a plurality of sampled values, each of the sampled values being at either a first logic level or a second logic level; and
    a counter, coupled to the sampler, for counting sampled values of the first logic level during a specific period of time to generate the decision value.

5. The PWM controlling module of claim 1 wherein the load detector is an integrator for integrating the PWM signal over a specific period of time to determine the decision value.

6. The PWM controlling module of claim 1 wherein the load detector detects a load current of the PWM controller to determine the decision value.

7. A method for adjusting a pulse width modulation (PWM) signal of a PWM controlling module, comprising:
generating the PWM signal which is utilized for controlling a supply voltage applied to an electronic system;
detecting a load of the electronic system according to the PWM signal and generating a decision value accordingly;
adjusting the PWM signal according to the decision value by:
setting a plurality of predetermined values; and
comparing the decision value with a first predetermined value to generate a control signal utilized to control the PWM controller; and
adjusting a reference voltage utilized by the PWM controller according to the control signal.

8. The method of claim 7, wherein the step of setting a plurality of predetermined values comprises:
utilizing a storage unit for storing the predetermined values; and
utilizing an interface controller for receiving an input value and storing the input value into the storage unit as a predetermined value.

9. The method of claim 7 further comprising:
comparing the decision value with a second predetermined value to generate at least an alarm signal to indicate that the load of the electronic system exceeds or deceeds an allowable range.

10. The method of claim 7 wherein the step of detecting a load of the electronic system comprises:
sampling the PWM signal to generate a plurality of sampled values, each of the sampled values being at either a first logic level or a second logic level; and
counting sampled values of the first logic level during a specific period of time to generate the decision value.

11. The method of claim 7 wherein the step of detecting a load of the electronic system comprises:
integrating the PWM signal over a specific period of time to determine the decision value.

12. The method of claim 7 wherein the step of detecting a load of the electronic system comprises:
detecting a load current of the PWM controller to determine the decision value.

13. A pulse width modulation (PWM) controlling module comprising:
a PWM controller for generating a PWM signal, the PWM signal being utilized for controlling a supply voltage applied to an electronic system;
a load detector, coupled to the PWM controller, for detecting a load of the electronic system according to the PWM signal and generating a decision value accordingly; and
an adjusting module, coupled to the PWM controller and the load detector, for controlling the PWM controller to adjust the PWM signal according to the decision value, the adjusting module comprising:
a storage unit for storing a plurality of predetermined values;
a logic circuit, coupled to the load detector and the storage unit, for comparing the decision value with a first predetermined value to generate a control signal utilized to control the PWM controller; and
an interface controller, coupled to the storage unit, for receiving an input value and storing the input value into the storage unit as a predetermined value.

14. A method for adjusting a pulse width modulation (PWM) signal of a PWM controlling module, comprising:
generating the PWM signal which is utilized for controlling a supply voltage applied to an electronic system;
detecting a load of the electronic system according to the PWM signal and generating a decision value accordingly;
adjusting the PWM signal according to the decision value by:
setting a plurality of predetermined values; and
comparing the decision value with a first predetermined value to generate a control signal utilized to control the PWM controller; and
comparing the decision value with a second predetermined value to generate at least an alarm signal to indicate that the load of the electronic system exceeds or deceeds an allowable range.

* * * * *